United States Patent
Zhu et al.

(10) Patent No.: US 12,454,198 B2
(45) Date of Patent: Oct. 28, 2025

(54) TRACTION BATTERY CONTROLLER UTILIZING VOLTAGE REBOUND OF PARALLEL-CONNECTED BATTERY CELLS TO DETECT FOR A THERMAL EVENT

(71) Applicant: Ford Global Technologies, LLC, Dearborn, MI (US)

(72) Inventors: Di Zhu, Novi, MI (US); Benjamin A. Tabatowski-Bush, Ann Arbor, MI (US); Patterson Kaduvinal Abraham, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 557 days.

(21) Appl. No.: 18/074,025

(22) Filed: Dec. 2, 2022

(65) Prior Publication Data

US 2024/0181932 A1 Jun. 6, 2024

(51) Int. Cl.
| | |
|---|---|
| *H02J 7/00* | (2006.01) |
| *B60L 50/64* | (2019.01) |
| *B60L 58/18* | (2019.01) |
| *B60L 58/24* | (2019.01) |
| *H01M 10/48* | (2006.01) |

(52) U.S. Cl.
CPC ............ *B60L 58/24* (2019.02); *B60L 50/64* (2019.02); *B60L 58/18* (2019.02); *H01M 10/482* (2013.01); *H01M 10/486* (2013.01); *B60L 2240/545* (2013.01); *B60L 2240/547* (2013.01); *H01M 2220/20* (2013.01)

(58) Field of Classification Search
CPC .... B60L 58/18; B60L 58/24; B60L 2240/545; B60L 2240/547; B60L 50/64; H01M 10/482; H01M 10/486; H01M 2220/20
USPC ......................................................... 320/144
See application file for complete search history.

(56) References Cited

U.S. PATENT DOCUMENTS

| | | | |
|---|---|---|---|
| 9,840,161 B2 | 12/2017 | Chikkannanavar et al. | |
| 10,994,617 B2 | 5/2021 | Rahbari Asr et al. | |
| 11,239,506 B2 | 2/2022 | Janarthanam et al. | |
| 2012/0119745 A1* | 5/2012 | Deveau ................ | G01R 31/396 |
| | | | 324/429 |
| 2021/0234209 A1 | 7/2021 | Wang et al. | |

OTHER PUBLICATIONS

Science Direct, Journal of Power Sources, A survey of methods for monitoring and detecting thermal runaway of lithium-ion batteries, vol. 436, Oct. 1, 2019, 226879.

* cited by examiner

*Primary Examiner* — Zixuan Zhou
(74) *Attorney, Agent, or Firm* — David B. Kelley; Brooks Kushman P.C.

(57) ABSTRACT

A method for detecting a thermal event of a battery, such as a traction battery of an electrified vehicle, includes monitoring a voltage of a group of parallel-connected cells of the battery. In response to confirming that the voltage of the group has a voltage rebound, a thermal event of the battery is detected. The detection of the thermal event may further depend on detection of a deviation of another operating parameter, such as temperature or pressure, of the battery.

12 Claims, 7 Drawing Sheets

TRACTION BATTERY CONTROLLER UTILIZING VOLTAGE REBOUND OF PARALLEL-CONNECTED BATTERY CELLS TO DETECT FOR A THERMAL EVENT

TECHNICAL FIELD

The present invention relates to detecting for a thermal event of a traction battery of an electrified vehicle.

BACKGROUND

An electrified vehicle includes a traction battery for providing power to a motor of the vehicle to propel the vehicle. The traction battery is comprised of battery cells. The battery cells may be monitored to detect for a thermal event.

SUMMARY

A method for detecting a thermal event of a battery, such as a traction battery of an electrified vehicle, is provided. The method includes confirming that a voltage of a group of parallel-connected cells of the battery has a voltage rebound. The method further includes generating an alert indicative of a thermal event of the battery in response to the voltage having the voltage rebound.

The method may further include confirming that an operating parameter of the battery has a deviation. In this case, the method further includes generating the alert in response to both of the voltage having the voltage rebound and the operating parameter having the deviation.

The method may further include confirming that a temperature and/or a pressure of the battery is greater than a predetermined temperature and/or predetermined pressure. In this case, the method further includes generating the alert in response to both of the voltage having the voltage rebound and the temperature and/or pressure of the battery being greater than the predetermined temperature and/or predetermined pressure.

Confirming that the voltage has the voltage rebound may include confirming that the voltage within a selected time range has the voltage rebound. Confirming that the voltage within the selected time range has the voltage rebound may include (i) confirming that a peak-to-peak value of a derivative of the voltage within the selected time range is greater than a predetermined threshold and/or (ii) confirming that the derivative of the voltage within the selected time range has a zero-crossing.

A system having a sensor and a controller is provided. The sensor is configured to monitor a voltage of a group of parallel-connected cells of a battery. The controller is configured to generate an alert indicative of a thermal event of the battery in response to detecting that the voltage has a voltage rebound.

A system having a traction battery and a controller is also provided. The traction battery has a group of parallel-connected cells. The controller is configured to detect a thermal event of the traction battery in response to detecting that a voltage of the group has a voltage rebound.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
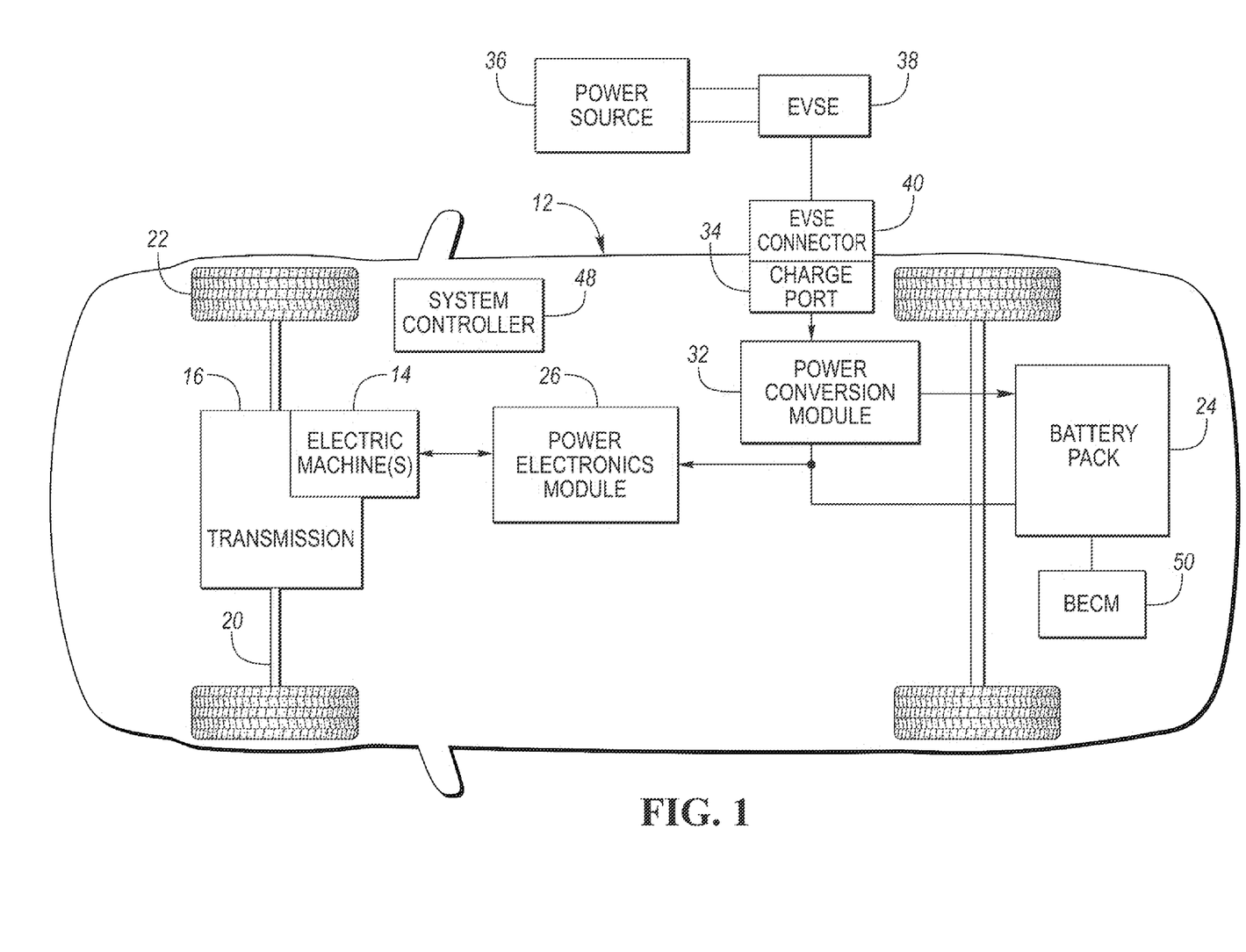
FIG. 1 illustrates a block diagram of an electrified vehicle having a traction battery.

Referring now to FIG. 1, a block diagram of an electrified vehicle (EV) 12 in the form of a battery electric vehicle (BEV) is shown. EV 12 includes a powertrain having one or more traction motors ("electric machine(s)") 14, a traction battery ("battery" or "battery pack") 24, and a power electronics module 26 (e.g., an inverter). In the BEV configuration, traction battery 24 provides all of the propulsion power and EV 12 does not have an engine. In other embodiments, EV 12 may be a hybrid electric vehicle (HEV) further having an engine for providing propulsion power.

Traction motor 14 is part of the powertrain of EV 12 for powering movement of the EV. In this regard, traction motor 14 is mechanically connected to a transmission 16 of EV 12. Transmission 16 is mechanically connected to a drive shaft 20 that is mechanically connected to wheels 22 of EV 12. Traction motor 14 can provide propulsion capability to EV 12 and is capable of operating as a generator. Traction motor 14 acting as a generator can recover energy that may normally be lost as heat in a friction braking system of EV 12.

Traction battery 24 stores electrical energy that can be used by traction motor 14 for propelling EV 12. Traction battery 24 typically provides a high-voltage (HV) direct current (DC) output. Traction battery 24 may be a lithium-ion battery. Traction battery 24 is electrically connected to power electronics module 26. Traction motor 14 is also electrically connected to power electronics module 26. Power electronics module 26, such as an inverter, provides the ability to bi-directionally transfer energy between traction battery 24 and traction motor 14. For example, traction battery 24 may provide a DC voltage while traction motor 14 may require a three-phase alternating current (AC) current to function. Inverter 26 may convert the DC voltage to a three-phase AC current to operate traction motor 14. In a regenerative mode, inverter 26 may convert three-phase AC current from traction motor 14 acting as a generator to DC voltage compatible with traction battery 24.

Traction battery 24 is rechargeable by an external power source 36 (e.g., the grid). External power source 36 may be electrically connected to electric vehicle supply equipment (EVSE) 38. EVSE 38 provides circuitry and controls to control and manage the transfer of electrical energy between external power source 36 and EV 12. External power source 36 may provide DC or AC electric power to EVSE 38. EVSE 38 may have a charge connector 40 for plugging into a charge port 34 of EV 12.

A power conversion module 32 of EV 12, such as an on-board charger having a DC/DC converter, may condition power supplied from EVSE 38 to provide the proper voltage and current levels to traction battery 24. Power conversion module 32 may interface with EVSE 38 to coordinate the delivery of power to traction battery 24.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating BEV 12. In embodiments, controller 48 is a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Controller 48 implements a battery energy control module (BECM) 50. BECM 50 is in communication with traction battery 24. BECM 50 is a traction battery controller operable for managing the charging and discharging of traction battery 24 and for monitoring operating parameters of the traction battery.

Traction battery 24 is comprised of one or more arrays of battery cells. The arrays include one or more groups of battery cells. The battery cells in a group are physically connected together in series and/or in parallel. The battery cell groups in an array are physically connected and adjacent to one another.

In accordance with the present disclosure, at least some of the battery cells of traction battery 24 are connected in parallel. For convenience, it will be assumed that all of the battery cells of traction battery 24 are connected in parallel.

Parallel-connected battery cells have unique characteristics during thermal propagation of a thermal event. Such a thermal event may be characterized by a self-heating state of the battery cells. Because of the unique characteristics, there are challenges with the parallel-connected battery cell configuration.

One challenge involves the use of a voltage deviation detection in the form of a voltage threshold comparison process. The voltage threshold comparison process monitors for the voltage of a battery cell group dropping below a predefined threshold (e.g., 1.0 volts) to determine whether a voltage condition (i.e., a voltage deviation) for a thermal event is present. The voltage threshold comparison process is suitable for a traction battery having only serial-connected battery cells but is less effective for a traction battery having parallel-connected battery cells during thermal propagation.

The voltage threshold comparison process is less effective because, unlike the voltage of a group of battery cells connected in series, the voltage of a group of battery cells connected in parallel does not monotonically drop during thermal propagation. Instead, during thermal propagation, the voltage of a group of parallel-connected battery cells rebounds (bounces) to a voltage slightly lower than the initial voltage of the group of battery cells. This is because the other battery cells in the group bring back up the voltage after the battery cell of the group experiencing the thermal event becomes inoperative. Consequently, it takes a relatively much longer time for the voltage of a group of parallel-connected battery cells to drop below the predefined threshold.

Figure 2A:
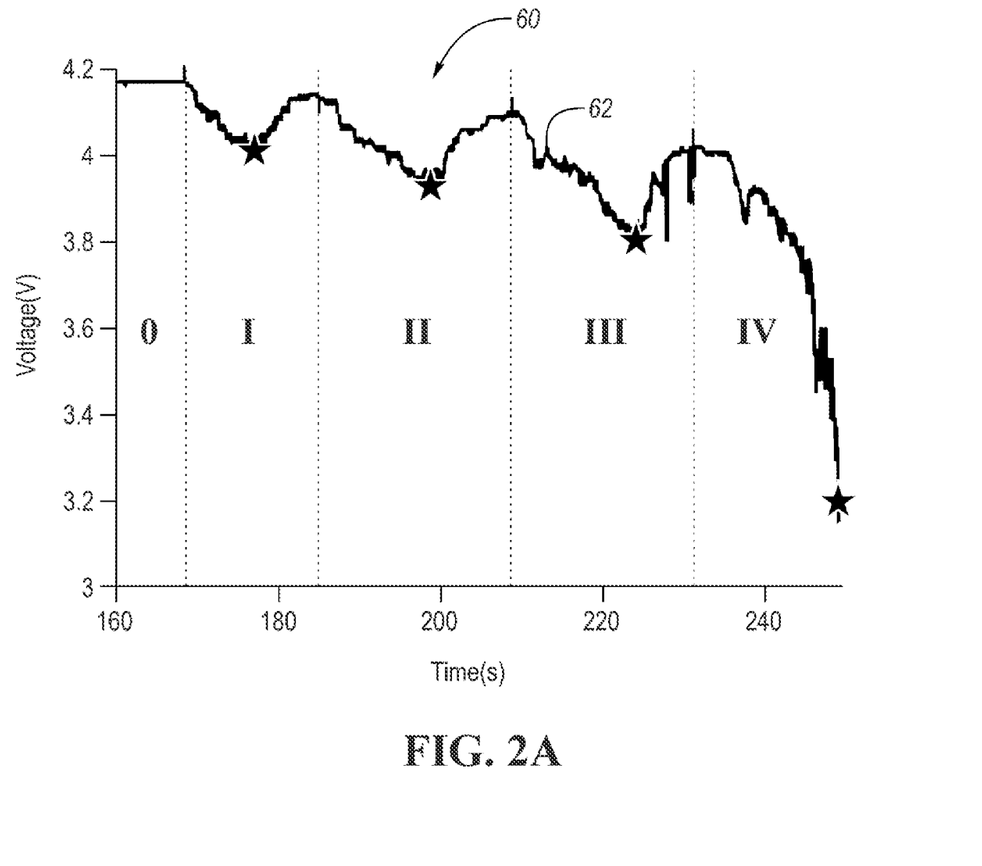
FIG. 2A illustrates a graph having a plot of the voltage of a group of parallel-connected battery cells of the traction battery from the start of thermal propagation until completion of a thermal event for the group.
Figure 2B:
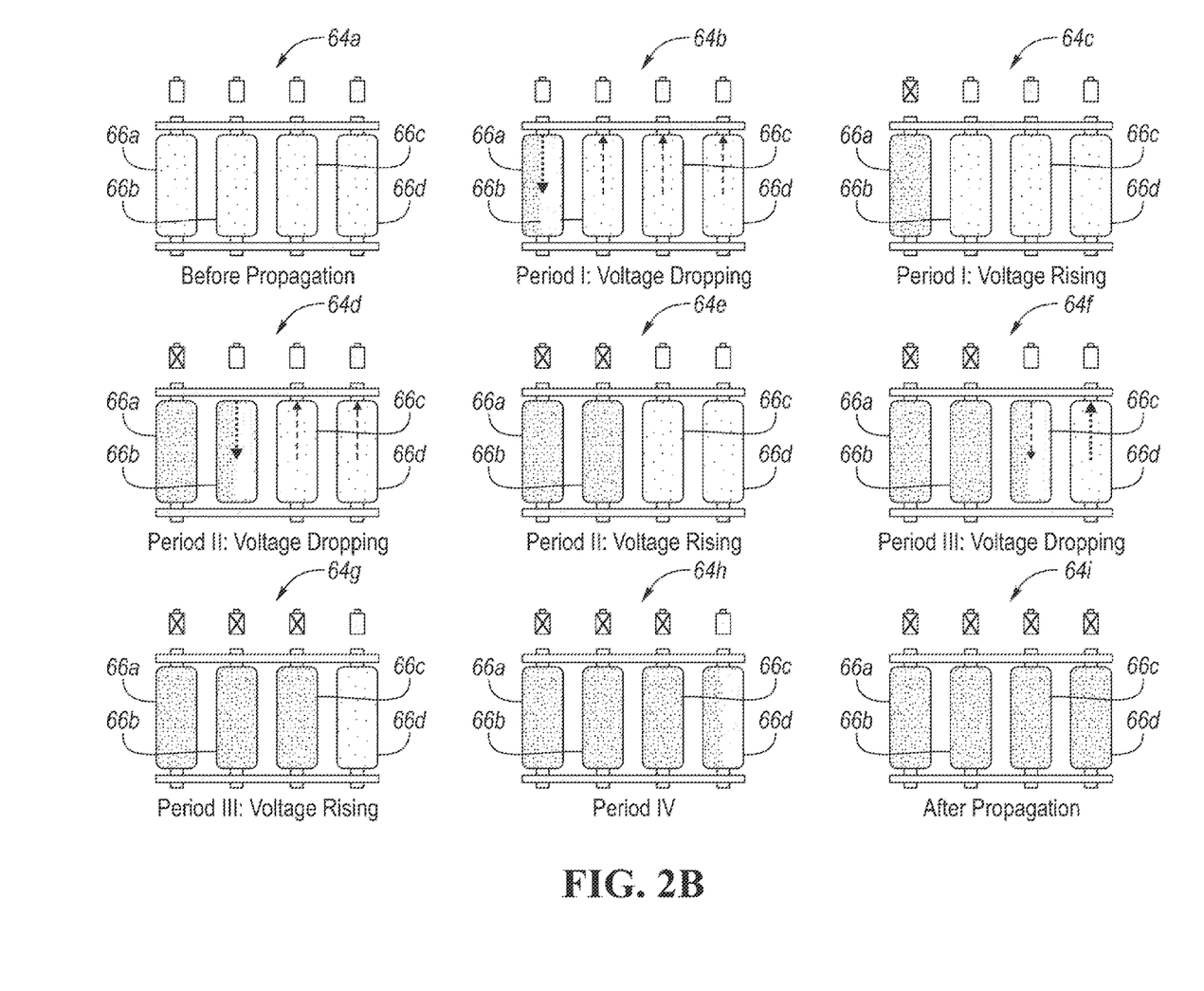
FIG. 2B illustrates a chronological set of schematic drawings depictive of the status of each battery cell of the group of parallel-connected battery cells from prior to the start of the thermal propagation until completion of the thermal event for the group.

Referring now to FIGS. 2A and 2B, the behavior of a group of parallel-connected battery cells of traction battery 24 during thermal propagation will be discussed in further detail. FIG. 2A illustrates a graph 60 having a plot 62 of the voltage of the group from the start of thermal propagation until completion of the thermal event for the group. FIG. 2B illustrates a chronological set of schematic drawings 64a, 64b, 64c, 64d, 64e, 64f, 64g, 64h, and 64i depictive of the status of each battery cell of the group from prior to the start of the thermal propagation until completion of the thermal event for the group.

As an example, as shown in schematic drawings 64, the group includes four battery cells 66 (namely, first, second, third, and fourth battery cells 66a, 66b, 66c, and 66d) connected in parallel. The status of parallel-connected battery cells 66 depicted in schematic drawings 64 includes the state-of-charge (SOC) of each battery cell, the temperature (normal, excessively warm, critically hot) of each battery cell, and the corresponding operative condition (fully operative, partially operative, and inoperative) of each battery cell.

As shown in schematic drawing 64a, prior to the start of thermal propagation, each battery cell 66 of the group of parallel-connected battery cells has a full SOC, a normal temperature, and is fully operative. The group of battery cells 66 has, for example, a nominal voltage of 4.2 volts, as shown in region O of voltage plot 62 of FIG. 2A, which corresponds to the time prior to the start of thermal propagation.

As shown in schematic drawings 64*b* and 64*c*, thermal propagation commences with first battery cell 66*a* initially experiencing an excessive increase in temperature and thereby initially being in the partially operative condition (schematic drawing 64*b*) until finally being in the inoperative condition (schematic drawing 64*c*). The temperature rise of first battery cell 66*a* causes the first battery cell to output less current which thereby causes the voltage of the group of battery cells 66 to decrease from the nominal voltage, as shown in the first portion of region I of voltage plot 62 of FIG. 2A, which corresponds to this voltage dropping period of the group of battery cells. In response to the voltage of the group of battery cells decreasing, second, third, and fourth battery cells 66*b*, 66*c*, and 66*d* output more current in an attempt to cause the voltage of the group of battery cells to increase back towards the nominal voltage, as shown in the second portion of region I of voltage plot 62 of FIG. 2A, which corresponds to this voltage rising period of the group of battery cells. In this way, the voltage of the group of battery cells rebounds to a first voltage slightly lower than the nominal voltage.

As shown in schematic drawings 64*d* and 64*e*, thermal propagation continues with second battery cell 66*b* initially experiencing an excessive increase in temperature and thereby initially being in the partially operative condition (schematic drawing 64*d*) until finally being in the inoperative condition (schematic drawing 64*e*). The temperature rise of second battery cell 66*b* causes the second battery cell to output less current which thereby causes the output voltage of the group of battery cells 66 to decrease from the first voltage, as shown in the first portion of region II of voltage plot 62 of FIG. 2A, which corresponds to this voltage dropping period of the group of battery cells. In response to the voltage of the group of battery cells decreasing, third and fourth battery cells 66*c* and 66*d* output more current in an attempt to cause the voltage of the group of battery cells to increase back towards the first voltage, as shown in the second portion of region II of voltage plot 62 of FIG. 2A, which corresponds to this voltage rising period of the group of battery cells. In this way, the voltage of the group of battery cells rebounds to a second voltage just slightly lower than the first voltage.

As shown in schematic drawings 64*f* and 64*g*, thermal propagation continues with third battery cell 66*c* initially experiencing an excessive increase in temperature and thereby initially being in the partially operative condition (schematic drawing 64*f*) until finally being in the inoperative condition (schematic drawing 64*g*). The temperature rise of third battery cell 66*c* causes the third battery cell to output less current which thereby causes the output voltage of the group of battery cells 66 to decrease from the second voltage, as shown in the first portion of region III of voltage plot 62 of FIG. 2A, which corresponds to this voltage dropping period of the group of battery cells. In response to the voltage of the group of battery cells decreasing, fourth battery cell 66*d* outputs more current in an attempt to cause the voltage of the group of battery cells to increase back towards the second voltage, as shown in the second portion of region III of voltage plot 62 of FIG. 2A, which corresponds to this voltage rising period of the group of battery cells. In this way, the voltage of the group of battery cells rebounds to a third voltage just slightly lower than the second voltage.

As shown in schematic drawings 64*h* and 64*i*, thermal propagation continues with fourth battery cell 66*d* initially experiencing an excessive increase in temperature and thereby initially being in the partially operative condition (schematic drawing 64*h*) until finally being in the inoperative condition (schematic drawing 64*i*). The temperature rise of fourth battery cell 66*d* causes the fourth battery cell to output less current which thereby causes the output voltage of the group of battery cells 66 to decrease from the third voltage, as shown in the first portion of region IV of voltage plot 62 of FIG. 2A, which corresponds to this voltage dropping period of the group of battery cells. As there are no more operative battery cells, the voltage of the group decreases relatively drastically, as shown in the second portion of region IV of voltage plot 62 of FIG. 2A, which corresponds to completion of the thermal event for the group.

At the end of region IV of voltage plot 62 of FIG. 2A, the voltage of the group of battery cells will fall below the predefined threshold and thereby be indicative that the thermal event of the group of battery cells 66 is present.

In summary, with reference to FIGS. 2A and 2B, a technical problem is that for parallel-connected battery cells, the voltage threshold comparison process is less effective to detect for the thermal event based on the voltage condition. This is primarily due to the operative battery cells in the group of parallel-connected battery cells making voltage rebounds in the voltage of the group until completion of the thermal event for the group.

Further, for certain thermal events, regulations set forth a countdown period (e.g., five minutes) to provide vehicle users with enough time to exit the vehicle. The countdown starts when the thermal event is detected, and a thermal alert is sent out to notify the vehicle driver. Hence, it is desirable to detect the thermal event as soon as possible.

In accordance with the present disclosure, BECM 50 (i.e., the traction battery controller) is configured to implement a voltage rebound monitoring process to detect for a thermal event of traction battery 24. In overview, the voltage rebound monitoring process enhances the effectiveness of the thermal event detection by utilizing the voltage rebound (voltage bounce) of a battery cell group to detect for the thermal event more effectively.

| The voltage rebound may be captured by comparing the voltages of the battery cell groups of traction battery 24 between a battery cell group of the traction battery experiencing thermal propagation and other battery cell groups of the traction battery. In addition to comparing battery group voltages, the voltage rebound may be detected by comparing the polarity and magnitude of the change rate between the battery cell group experiencing the thermal propagation and the other battery cell groups.

In general, the voltage rebound monitoring process has two levels. The first level is triggered when there is deviation, such as a voltage drop, temperature rise, temperature gradient, voltage fault, pressure rise, pressure fault, etc., reported by any of a provided set of corresponding traction battery sensors, such as a gas sensor (Hydrogen Fluoride (HF) sensor, hydrogen sensor, carbon monoxide (CO) sensor, and/or carbon dioxide ($CO_2$) sensor), a stress sensor, a smoke sensor, etc. No thermal alert is generated for the first level. The second level is obtained upon a different sensor confirming the thermal event.

An example showing contrast between (a) use of the voltage threshold comparison process on traction battery 24 having groups of parallel-connected battery cells and (b) use of the voltage rebound monitoring process on the traction battery will now be described with reference to FIG. 3A, which pertains to the voltage threshold comparison process, and FIG. 3B, which pertains to the voltage rebound monitoring process.

Figure 3A:
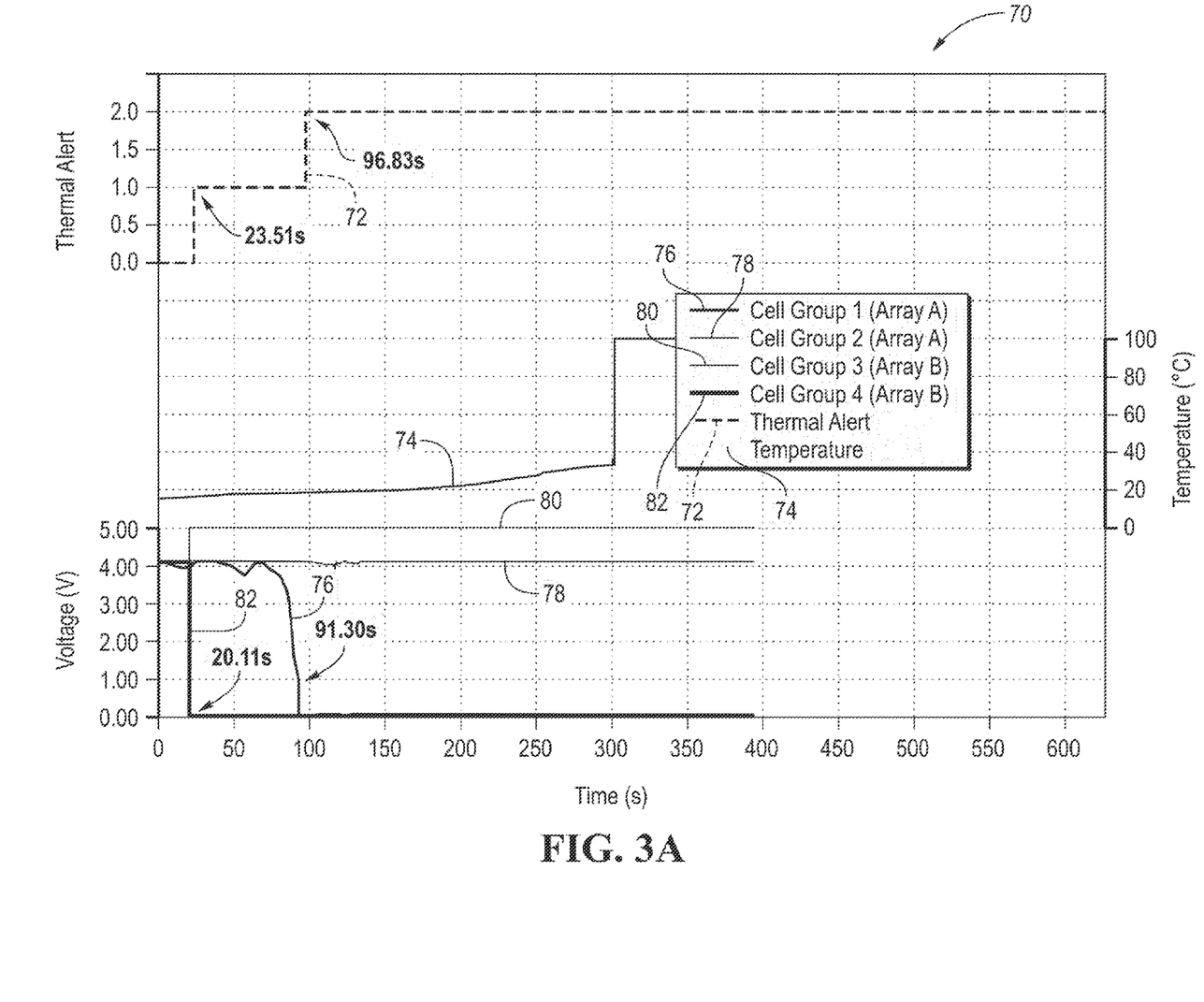
FIG. 3A illustrates a graph having a plot of a thermal alert level regarding the traction battery over a time period, a plot of the temperature of the traction battery over the time period, and plots of the voltages of first, second, third, and fourth groups of parallel-connected battery cells of the traction battery over the time period, the graph of FIG. 3A representing exemplary results of using a voltage threshold comparison process which monitors for the voltage of a group of battery cells dropping below a predefined threshold to detect for a thermal event of the traction battery.

Referring now to FIG. 3A, with continual reference to FIGS. 2A and 2B, a graph 70 which represents exemplary results of using the voltage threshold comparison process to detect for a thermal event of traction battery 24 is shown. As described, the voltage threshold comparison process for traction battery 24 entails monitoring for the voltage of one of the groups of parallel-connected battery cells dropping below a predefined threshold. Graph 70 includes a plot 72 of a thermal alert level regarding traction battery 24 over a time period, a plot 74 of the temperature of the traction battery over the time period, and plots 76, 78, 80, and 82 of the voltages of first, second, third, and fourth groups of parallel-connected battery cells of the traction battery, respectively, over the time period.

The thermal alert has three levels: no thermal event detected (thermal alert range of 0.0 up to 1.0 units), external monitoring required (thermal alert range of 1.0 up to 2.0 units) and thermal event confirmed (thermal alert value of 2.0 or more units). The thermal event commences at zero seconds as indicated by the initial slight dropping of voltage plot 76 of the first battery cell group #1. The first battery cell group #1 is thus the trigger battery cell group. The first battery cell group #1 and the second battery cell group #2 are in the same array "A". As such, the second cell group #2 is the adjacent battery cell group to the trigger battery cell group. Voltage plot 78 of the second cell group #2 indicates that there is no voltage response for the second cell group #2 until about ninety seconds. The third battery cell group #3 and the fourth battery cell group #4 are in a different array "B". Their voltage sense leads are damaged at 20.11 seconds, as shown by voltage plots 80 and 82.

As noted, temperature plot 74 is indicative of the temperature of traction battery 24. The temperature information is provided by a thermistor in an array of traction battery 24. It will be assumed that the array is an array other than the array A. Accordingly, as there is no thermistor in the array A (i.e., no thermistor in the trigger array), the thermistor does not pick up any significant heat. This makes the voltage threshold comparison process less effective. Consequently, the thermal event is only confirmed after the voltage of the first cell group #1 drops below the predefined threshold of 1.0 volts, which occurs at 91.30 seconds, as shown by voltage plot 76.

Figure 3B:
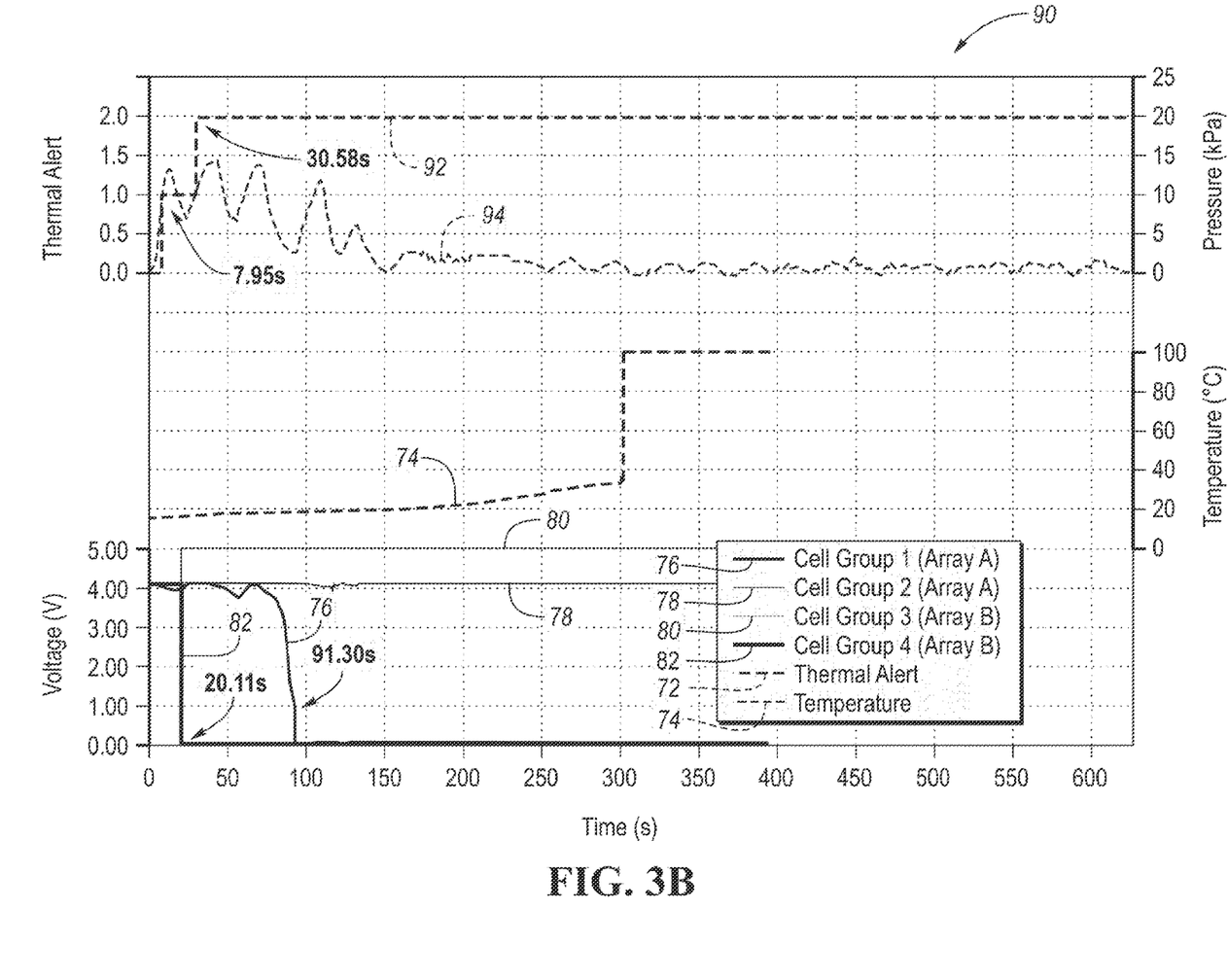
FIG. 3B illustrates a graph having a plot of a thermal alert level regarding the traction battery over the time period, plots of the temperature and the pressure of the traction battery over the time period, and plots of the voltages of the first, second, third, and fourth groups of parallel-connected battery cells of the traction battery over the time period, the graph of FIG. 3B representing exemplary results of using a voltage rebound monitoring process in accordance with the present disclosure to detect for a thermal event of the traction battery.

Referring now to FIG. 3B, with continual reference to FIGS. 2A, 2B, and 3A, a graph 90 which represents exemplary results of using the voltage rebound monitoring process is shown. The voltage rebound monitoring process advances on the voltage threshold comparison process by using the voltage rebound of a battery cell group experiencing thermal propagation as a signature to enhance the effectiveness of the thermal event detection. In addition to the voltage rebound, the voltage rebound monitoring process may further use a secondary technology sensor (e.g., pressure sensor) to confirm the thermal event.

Graph 90 includes a plot 92 of a thermal alert level regarding traction battery 24 over the time period, a plot 94 of a pressure of the traction battery over the time period, plot 74 of the temperature of the traction battery over the time period, and plots 76, 78, 80, and 82 of the voltages of the first, second, third, and fourth groups of parallel-connected battery cells of the traction battery over the time period, respectively.

In this example, 10.0 kPa is used as a pressure threshold as indicated in graph 90. Further in this example, as shown by pressure plot 94, the detected pressure of traction battery 24 increases above the pressure threshold at 7.95 seconds. The pressure detection being affirmative is the first piece of evidence that the thermal event is present. The second piece of evidence to confirm the presence of the thermal event is the voltage rebound due to the parallel-connected battery cells in the same battery cell group with the trigger battery cell. In this example, the initial portion of voltage plot 76 indicates the voltage rebound of the first battery cell group. As a result, the thermal event is confirmed at 30.58 seconds, as indicated by thermal alert level plot 92. Consequently, in this example, the detection time is shortened to about one-third of the detection time (i.e., 91.30 seconds down to 30.58 seconds). In summary, in this example, the pressure reaches 10.0 kPa at 7.95 seconds which triggers the external monitoring and the voltage rebound serves as the confirmation of the thermal event at 30.58 seconds.

Figure 4:
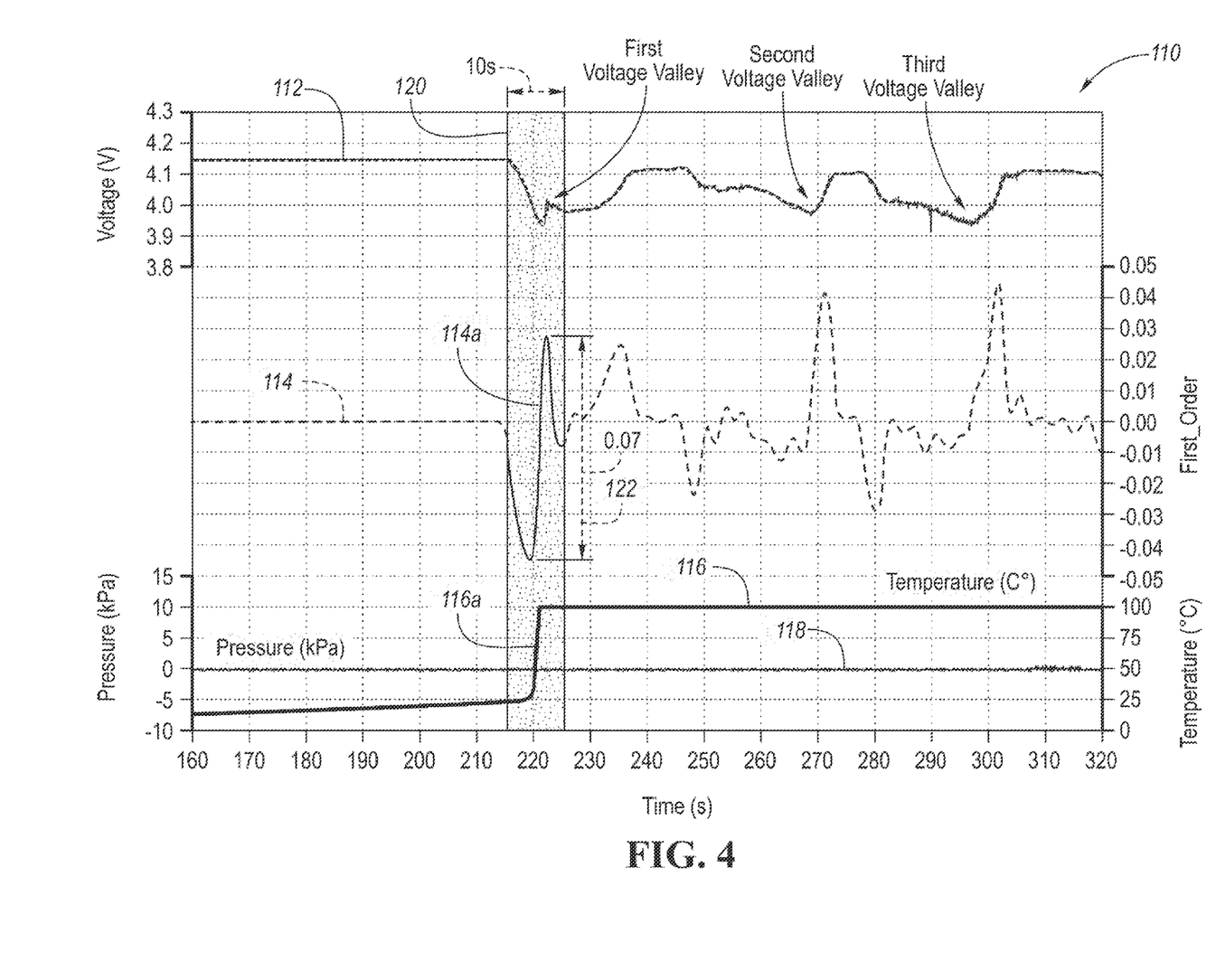
FIG. 4 illustrates a graph having a plot of the voltage of a group of parallel-connected battery cells of the traction battery over a time period, a plot of the derivative of the voltage of the battery cell group with respect to time over the time period, and plots of the temperature and the pressure of the traction battery over the time period, the graph of FIG. 4 being provided to describe in further detail the voltage rebound monitoring process.

Referring now to FIG. 4, with continual reference to FIG. 3B, the voltage rebound monitoring process will be described in further detail. FIG. 4 includes a graph 110 having a plot 112 of the voltage of a group of parallel-connected battery cells of traction battery 24 over a time period, a plot 114 of the derivative of the voltage of the battery cell group with respect to time over the time period, a plot 116 of the temperature of the traction battery over the time period, and a plot 118 of the pressure of the traction battery over the time period.

The voltage rebound monitoring process employs the following steps to address noise robustness of the rebound (bounce) of the voltage of a parallel-connected battery cell group experiencing thermal propagation. One step is that a low-pass filter for the voltage of the battery cell group is employed to eliminate high frequency content of the battery cell group voltage. Another step is that a sliding window is used for the detection of rebounds of the (filtered) voltage of the battery cell group. The size of the window is calibratable and depends on the characteristics of the battery cell group thermal event behavior. Within the sliding window, both of (i) a zero-crossing of the derivative (dV/dt) of the voltage of the battery cell group and (ii) the difference between a minimum and a maximum of the derivative of the voltage of the battery cell in comparison to a predefined derivative voltage threshold are monitored. The voltage rebound monitoring process may detect the thermal event when both conditions are met (i.e., (i) the derivative voltage dV/dt has a zero-crossing within the sliding window and (ii) a peak-to-peak of the derivative voltage dV/dt within the siding window is greater than the derivative voltage dV/dt threshold). More particularly, the voltage rebound monitoring process detects the thermal event when both conditions are met and a secondary confirmation, such as from a pressure sensor or a temperature sensor, is provided.

Graph 110 illustrates how the voltage rebound monitoring process functions from a physical test. Voltage plot 112 is the (original and filtered) voltage of the battery cell group. Derivative voltage plot 114 is the derivative (dV/dt) of the voltage of the battery cell group. The derivative voltage dV/dt threshold to set at a value of, for example, 0.05 v/t.

As shown in graph 110, a sliding window 120 is utilized. Sliding window 120 is set at a duration of ten seconds because the battery cells used in this example perform voltage rebounds within a ten second range. Sliding window 120 is set at the moment of operation being monitored in the time period, which in this example is at the time range of 215 to 225 seconds.

For convenience, the portion of derivative voltage plot 114 falling within sliding window 120 is designated with reference numeral 114a. The derivative voltage dV/dt of derivative voltage plot portion 114a falling within sliding window 120 has a zero-crossing. Further, the peak-to-peak of derivative voltage plot portion 114*a* falling within sliding window 120 is 0.07 v/t, as indicated by peak-to-peak range 122. Accordingly, the peak-to-peak derivative voltage of the battery cell group within the monitored sliding window 120 is greater than the dV/dt threshold (i.e., 0.07 v/t is greater than 0.05 v/t).

Thus, in this example, as both of the derivative voltage zero-crossing and peak-to-peak conditions are met, the voltage rebound monitoring process detects the thermal event within the ten seconds. With a corresponding rise of temperature of traction battery 24, as indicated by temperature plot portion 116*a* within sliding window 120, the voltage rebound monitoring process confirms the thermal event in ten seconds. In contrast, in this example, the voltage threshold comparison process would not detect the thermal event by at least one-hundred seconds after the thermal event occurs.

Regarding the performance of the pressure sensor, pressure plot 118 indicates that the pressure sensor is not able to detect the pressure difference. This is because, in this example, the pressure sensor is sensitive to traction battery volume and venting effects.

Figure 5:
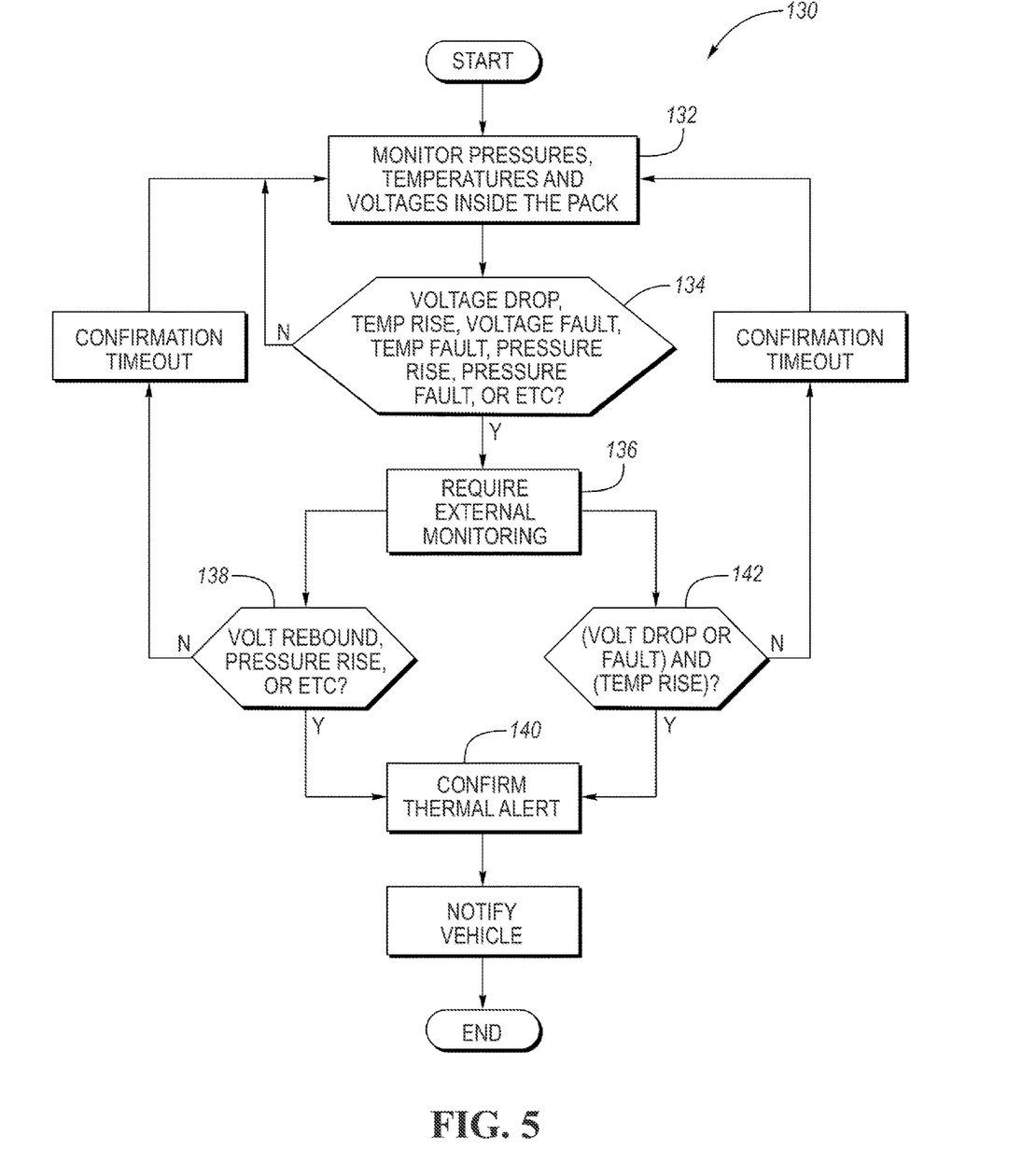
FIG. 5 illustrates a flowchart depicting operation steps of the voltage rebound monitoring process carried out by a traction battery controller to detect for a thermal event of the traction battery.

Referring now to FIG. 5, with continual reference to FIGS. 3B and 4, a flowchart depicting operation steps of the voltage rebound monitoring process carried out by traction battery controller 50 to detect for a thermal event of traction battery 24 is shown. In operation, traction battery controller 50 monitors various operating parameters of traction battery 24 including pressures, temperatures, and voltages of the traction battery, as indicated by process block 132. The monitored voltages include the voltages of groups of parallel-connected battery cells of traction battery 24.

Traction battery controller 50 detects for whether there is a deviation in the monitored operating parameters, as indicated by decision block 134. As described, the operation pertaining to decision block 134 is the first level detection of the voltage rebound monitoring process. This first level detection is triggered when a deviation, such as a voltage drop, temperature rise, temperature gradient, voltage fault, pressure rise, pressure fault, etc., is present. In this case, the operation moves to the second level detection of the voltage rebound monitoring process, as indicated by process block 136.

The second level detection involves traction battery controller 50 detecting for the presence of either one of two conditions. The first condition is whether any of the monitored voltages of the groups of parallel-connected battery cells exhibits a voltage rebound or whether there is a pressure rise or a relatively high amount of gas or the like, as indicated by decision block 138. If so, then traction battery controller 50 detects the thermal event of traction battery 24, as indicated by process block 140. The second condition is whether any of the monitored voltages of traction battery 24 have an abnormal voltage drop or a voltage fault accompanied by a relatively excessive rise in the temperature of the traction battery, as indicated by decision block 142. If so, then traction battery controller 50 detects the thermal event of traction battery 24, as indicated by process block 140.

Traction battery controller 50 can implement corresponding control actions of traction battery 24 and/or EV 12 in response to detecting the thermal event of the traction battery. For instance, traction battery controller 50 can shut off or reduce power provided to traction battery 24 upon detecting the thermal event of the traction battery. Traction battery controller 50 can also cause appropriate alerts to be generated for receipt by vehicle users upon detecting the thermal event of traction battery 24.

In summary, the voltage rebound monitoring process progresses the effectiveness of the voltage threshold comparison process for electrified vehicle applications. As noted, the voltage threshold comparison process waits until all of the battery cells in a group of parallel-connected battery cells become inoperative before the voltage threshold comparison process can declare a voltage deviation. The voltage rebound monitoring process progresses the effectiveness by utilizing the voltage rebound of the battery cells in the group of parallel-connected battery cells to detect the thermal event which thereby shortens the detection time.

As such, a benefit of the voltage rebound monitoring process is to take the confirmation time for a highly paralleled battery cell group from a typical time (such as on the order of ninety seconds per the described example) to a relatively much shorter time (such as on the order of ten seconds per the described example). The actual saving in confirmation time depends on how many parallel-connected battery cells are present and the battery cell-to-cell propagation time.

Additionally, the voltage rebound monitoring process may combine the voltage rebound detection technique with pressure response to further progress the effectiveness. Besides the pressure response, a response from other sensors such as a HF sensor, a hydrogen sensor, a CO sensor, a $CO_2$ sensor, a stress sensor, or a smoke sensor can be used as evidence that the thermal event is present.

Notably, as described herein, using a sensor alone, such as a pressure sensor, is insufficient to detect the thermal event. A confirmation from a second technology sensor, such as the voltage rebound detection technique, is required.

For example, the following is a list of considerations as to why a pressure sensor is insufficient to detect the thermal event. When a battery cell monitored by the pressure sensor has a slow venting behavior, the pressure sensor may not be able to accurately detect the pressure. The signal-to-noise (SNR) ratio for the pressure sensor may be relatively weak and the pressure sensor may therefore be prone to false positives due to external pressure spikes. The pressure sensor may not have a relatively fast enough processor for its observation (e.g., <20 msec type pressure rise). The pressure sensor may be sensitive to battery pack volume and venting effects. The pressure sensor may result in a high chance of type 1 and type 2 faults.

In conclusion, relying on a pressure sensor alone is insufficient and a confirmation from a second sensor is required. The voltage threshold comparison detection is slower with parallel-connected battery cell groups than with serial-connected battery cell groups. Depending on the location of thermal event, temperature sensing alone via the use of a thermistor to detect the thermal event could be even slower.

As described, a traction battery controller (i.e., the BECM) is configured to implement the voltage rebound monitoring process in accordance with the present disclosure. The voltage rebound monitoring process provides a two-stage detection mechanism. As one of the detection conditions (e.g., voltage bounce, voltage drop, voltage sensor fault, steep temperature increase, temperature sensor fault, etc.), the battery cell voltage data is used to rapidly identify the signature of thermal event/propagation in terms of voltage responses from parallel-connected battery cells. The signature as the voltage rebound (bounce) is used along with one of the other conditions to confirm the thermal event quickly and effectively.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method comprising:
confirming that a voltage of a group of parallel-connected cells of a battery has a voltage rebound; and
generating an alert indicative of a thermal event of the battery in response to (i) the voltage having the voltage rebound and (ii) either a temperature of the battery being greater than a predetermined temperature or a pressure of the battery being greater than a predetermined pressure.

2. A method comprising:
confirming that a voltage of a group of parallel-connected cells of a battery has a voltage rebound, wherein confirming that the voltage has the voltage rebound includes confirming that the voltage within a selected time range has the voltage rebound; and
generating an alert indicative of a thermal event of the battery in response to the voltage having the voltage rebound.

3. The method of claim 2 wherein:
confirming that the voltage within the selected time range has the voltage rebound includes confirming that a peak-to-peak value of a derivative of the voltage within the selected time range is greater than a predetermined threshold.

4. The method of claim 3 wherein:
confirming that the voltage within the selected time range has the voltage rebound includes confirming that the derivative of the voltage within the selected time range has a zero-crossing.

5. The method of claim 2 wherein:
confirming that the voltage within the selected time range has the voltage rebound further includes confirming that a derivative of the voltage within the selected time range has a zero-crossing.

6. The method of claim 1 wherein:
the battery is a traction battery of an electrified vehicle.

7. A system comprising:
a sensor configured to monitor a voltage of a group of parallel-connected cells of a battery; and
a controller configured to generate an alert indicative of a thermal event of the battery in response to detecting that the voltage has a voltage rebound, wherein the controller is configured to detect that the voltage has the voltage rebound in response to detecting that a peak-to-peak value of a derivative of the voltage within a selected time range is greater than a predetermined threshold.

8. The system of claim 7 further comprising:
a second sensor configured to monitor an operating parameter of the battery; and
wherein the controller is further configured to generate the alert in response to (i) detecting that the voltage has the voltage rebound and (ii) detecting that the operating parameter of the battery has a deviation.

9. The system of claim 8 wherein:
the operating parameter of the battery is a temperature of the battery.

10. The system of claim 8 wherein:
the operating parameter of the battery is a pressure of the battery.

11. The system of claim 7 wherein:
the controller is further configured to detect that the voltage has the voltage rebound in response to further detecting that a derivative of the voltage within the selected time range has a zero-crossing.

12. The system of claim 7 wherein:
the battery is a traction battery of an electrified vehicle.

* * * * *